(12) United States Patent
Kwon et al.

(10) Patent No.: US 11,483,774 B2
(45) Date of Patent: *Oct. 25, 2022

(54) APPARATUS AND METHOD FOR CONTROLLING UPLINK TRANSMISSION POWER IN A MULTIPLE ELEMENT CARRIER WAVE SYSTEM

(71) Applicant: PANTECH CORPORATION, Seoul (KR)

(72) Inventors: Ki Bum Kwon, Seoul (KR); Myung Cheul Jung, Seoul (KR); Jae Hyun Ahn, Seoul (KR)

(73) Assignee: PANTECH CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,593

(22) Filed: Mar. 8, 2021

(65) Prior Publication Data
US 2021/0204222 A1 Jul. 1, 2021

Related U.S. Application Data

(63) Continuation of application No. 16/826,054, filed on Mar. 20, 2020, now Pat. No. 10,945,217, which is a (Continued)

(30) Foreign Application Priority Data

Nov. 15, 2011 (KR) ........................ 10-2011-0119154

(51) Int. Cl.
*H04W 52/14* (2009.01)
*H04W 52/28* (2009.01)
(Continued)

(52) U.S. Cl.
CPC .......... *H04W 52/146* (2013.01); *H04L 5/001* (2013.01); *H04W 52/281* (2013.01);
(Continued)

(58) Field of Classification Search
CPC . H04W 52/146; H04W 52/281; H04W 52/40; H04W 52/50; H04W 72/1268;
(Continued)

(56) References Cited

U.S. PATENT DOCUMENTS

| | | | |
|---|---|---|---|
| 6,553,016 B1 * | 4/2003 | Roxbergh | H04W 52/40 370/332 |
| 8,787,310 B2 * | 7/2014 | Sahara | H04W 52/04 370/332 |

(Continued)

*Primary Examiner* — Dominic E Rego
(74) *Attorney, Agent, or Firm* — Capitol IP Law Group, PLLC

(57) ABSTRACT

The present invention relates to an apparatus and method for controlling uplink transmission power in a multiple element carrier wave system. The method for controlling uplink transmission power by a terminal in a multiple element carrier wave system includes the steps of: generating an uplink signal to be transmitted in a first serving cell; receiving, from a base station, random access start information for commanding the start of a random access procedure for a second serving cell; calculating the estimated surplus power from first transmission power scheduled for an uplink signal transmission, and second transmission power scheduled for a transmission of a PRACH to which a random access preamble is mapped; and when the estimated surplus power is smaller than a threshold power, adjusting the first transmission power or the second transmission power on the basis of power allocation priority.

14 Claims, 10 Drawing Sheets

Related U.S. Application Data continuation of application No. 16/293,321, filed on Mar. 5, 2019, now Pat. No. 10,609,650, which is a continuation of application No. 16/028,609, filed on Jul. 6, 2018, now abandoned, which is a continuation of application No. 15/653,355, filed on Jul. 18, 2017, now Pat. No. 10,045,304, which is a continuation of application No. 15/077,466, filed on Mar. 22, 2016, now Pat. No. 9,713,095, which is a continuation of application No. 14/357,557, filed as application No. PCT/KR2012/009177 on Nov. 2, 2012, now Pat. No. 9,313,743.

(51) Int. Cl.
| | | |
|---|---|---|
| *H04W 52/34* | (2009.01) | |
| *H04W 52/36* | (2009.01) | |
| *H04W 74/08* | (2009.01) | |
| *H04W 72/12* | (2009.01) | |
| *H04L 5/00* | (2006.01) | |
| *H04W 52/40* | (2009.01) | |
| *H04W 52/50* | (2009.01) | |
| *H04W 52/24* | (2009.01) | |
| *H04W 74/00* | (2009.01) | |

(52) U.S. Cl.
CPC ........... *H04W 52/40* (2013.01); *H04W 52/50* (2013.01); *H04W 72/1268* (2013.01); *H04W 74/0833* (2013.01); *H04W 52/241* (2013.01); *H04W 52/34* (2013.01); *H04W 52/365* (2013.01); *H04W 74/006* (2013.01); *Y02D 30/70* (2020.08)

(58) Field of Classification Search
CPC ........... H04W 74/0833; H04W 52/241; H04W 52/34; H04W 52/365; H04W 74/006; H04L 5/001; Y02B 60/50
See application file for complete search history.

(56) References Cited

U.S. PATENT DOCUMENTS

| | | | | |
|---|---|---|---|---|
| 9,215,675 | B2* | 12/2015 | Kim | H04W 52/38 |
| 2004/0131029 | A1* | 7/2004 | Tobe | H04W 52/322 |
| | | | | 455/436 |
| 2004/0235510 | A1* | 11/2004 | Elicegui | H04W 52/40 |
| | | | | 455/114.2 |
| 2009/0052388 | A1* | 2/2009 | Kim | H04W 74/0866 |
| | | | | 370/329 |
| 2011/0171944 | A1* | 7/2011 | Kobayashi | H04W 88/085 |
| | | | | 455/418 |
| 2011/0206000 | A1* | 8/2011 | Kwon | H04W 74/002 |
| | | | | 370/329 |
| 2011/0310828 | A1* | 12/2011 | Lin | H04W 28/06 |
| | | | | 370/329 |
| 2012/0275394 | A1* | 11/2012 | Gunnarsson | H04W 28/04 |
| | | | | 370/329 |
| 2015/0078219 | A1* | 3/2015 | Li | H04W 74/004 |
| | | | | 370/278 |

* cited by examiner

APPARATUS AND METHOD FOR CONTROLLING UPLINK TRANSMISSION POWER IN A MULTIPLE ELEMENT CARRIER WAVE SYSTEM

CROSS-REFERENCE TO RELATED APPLICATIONS

This application is a continuation of U.S. patent application Ser. No. 16/826,054, filed on Mar. 20, 2020, which is a continuation of U.S. patent application Ser. No. 16/293,321, filed on Mar. 5, 2019, now issued as U.S. Pat. No. 10,609,650, which is a continuation of U.S. patent application Ser. No. 16/028,609, filed on Jul. 6, 2018, which is a continuation of U.S. patent application Ser. No. 15/653,355, filed on Jul. 18, 2017, now issued as U.S. Pat. No. 10,045,304, which is a continuation of U.S. patent application Ser. No. 15/077,466, filed on Mar. 22, 2016, now issued as U.S. Pat. No. 9,713,095, which is a continuation of U.S. patent application Ser. No. 14/357,557, filed on May 9, 2014, now issued as U.S. Pat. No. 9,313,743, which is the National Stage Entry of International Application PCT/KR2012/009177, filed on Nov. 2, 2012 and claims the priority from and the benefit of Korean Patent Application No. 10-2011-0119154, filed on Nov. 15, 2011, all of which are incorporated herein by reference for all purposes as if fully set forth herein.

BACKGROUND

Field

The present invention related to wireless communication and more particularly, an apparatus and method for controlling uplink transmission power in a multiple component carrier system.

Discussion of the Background

The $3^{rd}$ Generation Partnership Project (3GPP) Long Term Evolution (LTE) and IEEE (Institute of Electrical and Electronics Engineers) 802.16m technology are under development as candidates for the next generation wireless communication technology. The IEEE 802.16m specification not only supports compatibility with legacy systems by relying on a revision of the existing 802.16e specification but also secures continuity towards a future technology meant for the next generation. IMT-Advanced system. Therefore, the 802.16m specifications are required to meet advanced requirements for the IMT-Advanced system while maintaining compatibility with Mobile WiMAX systems based on the 802.16e specifications.

Most wireless communication systems make use of one frequency band for data transmission. For example, the $2^{nd}$ wireless communication system uses a frequency band in the range of 200 KHz to 1.25 MHz while the $3^{rd}$ wireless communication system uses a frequency band ranging from 5 MHz to 10 MHz. To support ever-increasing transmission throughput, the latest 3GPP LTE or 802.16m is increasing frequency bandwidth up to 20 MHz or more. Increasing bandwidth is essential to deal with high transmission throughput, but large power consumption is caused to support large bandwidth even when required communication service quality is low.

In this regard, a multiple component carrier system is emerging, which defines a carrier having one frequency band and a center frequency and enables broadband transmission and/or reception of data through multiple carriers. In other words, by using one or more carriers, narrow and broad band are supported at the same time. For example, if a carrier uses a bandwidth of 5 MHz, a maximum of 20 MHz can be supported by utilizing four carriers of the is same kind.

One way for a base station to utilize the resources of a user equipment in an efficient manner is to utilize information about power of the user equipment. Power control technology is essential to minimize inference factors for efficient distribution of resources in wireless communication and to reduce battery consumption of a user equipment. A user equipment can determine uplink transmission power according to scheduling information such as Transmit Power Control (TPC) allocated by a base station, Modulation and Coding Scheme (MCS), and frequency bandwidth.

Since uplink transmission power of a component carrier has to be taken into account in a comprehensive manner as a multiple component carrier system is introduced, power control of a user equipment becomes more complicated. This complexity can bring about a problem in view of maximum transmission power of the user equipment. In most cases, the user equipment should operate based on the power lower than maximum transmission power within an allowable range. If a base station performs scheduling requiring transmission power more than the maximum transmission power, actual uplink transmission power may exceed the maximum transmission power, leading to a problematic situation. This is so because power control of multiple component carriers is not explicitly defined or information about uplink transmission power is not fully shared between the user equipment and the base station.

SUMMARY

An object of the present invention is to provide an apparatus and a method for controlling uplink transmission power in a multiple component carrier system.

Another object of the present invention is to provide an apparatus and a method for allocating transmission power to a physical uplink channel in a plurality of service cells.

A yet another object of the present invention is to provide an apparatus and a method for determining a priority of allocating transmission power in a physical uplink channel in a plurality of serving cells.

Solution to the Problem

According to one aspect of the present invention, a method for controlling uplink transmission power by a user equipment in a multiple component carrier system is provided. The method for controlling uplink transmission power comprises generating an uplink signal to be transmitted on a first serving cell, receiving from a base station random access start information commanding start of a random access procedure for a second serving cell; calculating estimated power headroom from second transmission power scheduled for transmission of a Physical Random Access Channel (PRACH) to which a random access preamble is mapped; and in case the estimated power headroom is smaller than a threshold, adjusting the first transmission power or the second transmission power based on a power allocation priority.

When an uplink signal is to be transmitted in a multiple component carrier system, uplink transmission power can be distributed in an efficient manner if the uplink signal is transmitted selectively according to a priority order of power allocation. Also, since power is distributed according to a simple but clear rule, system performance can be improved while reducing system complexity at the same time.

BRIEF DESCRIPTION OF THE DRAWINGS

FIG. 2 illustrates intra-band contiguous carrier aggregation while

DETAILED DESCRIPTION OF THE ILLUSTRATED EMBODIMENTS

In what follows, a few embodiments according to the present invention will be described in detail with reference to accompanying drawings. It should be noted that in assigning reference symbols to the respective constituting elements, the same symbols are used for the same constituting elements as possibly as can be throughout the document though they may be found in different drawings. Also, for the sake of describing embodiments of the present invention, if it is determined that specific descriptions about a structure or a function known to the corresponding technical field unnecessarily obscures the technical principles of the present invention, the corresponding descriptions will be omitted.

This document is related to a wireless communication network. It is assumed that tasks of a wireless communication network can be carried out by a system supervising the corresponding wireless communication network (for example, a base station) while controlling the network and transmitting data, or the tasks can be carried out by a user equipment connected to the corresponding wireless communication network.

Figure 1:
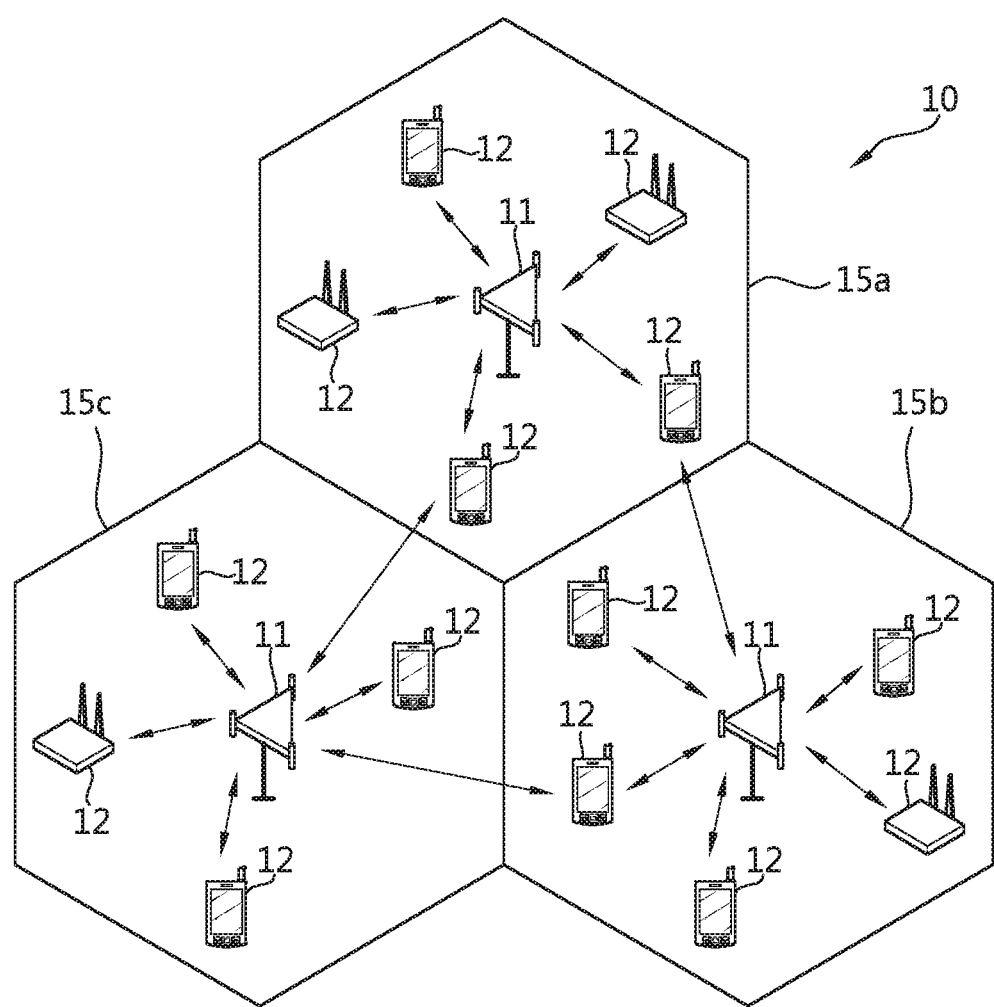
FIG. 1 illustrates one example of a wireless communication system to which the present invention is applied.

FIG. 1 illustrates one example of a wireless communication system to which the present invention is applied.

With reference to FIG. 1, the wireless communication system 10 is deployed in wide areas to provide various kinds of communication services such as a voice and packet data service.

The wireless communication system 10 comprises at least one Base Station (BS) 11. Each BS 11 provides communication services intended for a particular geographic region (which is usually called a cell) 15a, 15b, 15c. A cell can be divided into a plurality of sub-regions (which are called sectors).

A User Equipment (UE) 12 may be stationary or mobile and can be referred to by different terms such as a Mobile Terminal (MT), User Terminal (UT), Subscriber Station (SS), wireless device, Personal Digital Assistant (PDA), wireless modem, handheld device, and the like.

The BS 11 usually refers to a station communicating with the UE 12 and can be referred to by different terms such as an evolved-NodeB (eNB), Base Transceiver System (BTS), access point, and the like. It should be noted that a cell is a generic term indicating a local area covered by the BS 11 and represents various types of cells, including a megacell, macrocell, microcell, picocell, femtocell, and the like.

In what follows, downlink transmission denotes communication from the BS 11 to the UE 12, and uplink transmission denotes communication from the UE 12 to the BS 12. In the downlink transmission, a transmitter can be a part of the BS 11 while a receiver can be a part of the UE 12.

In the uplink transmission, a transmitter can be a part of the UE 12 while a receiver can be a part of the base station 11.

There is no limitation on the multiple access techniques used for a wireless communication system. Various multiple access techniques such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA can be used. For uplink and downlink transmission, a Time Division Duplex (TDD) technique can be used, which carries out data transmission by using different time slots or a Frequency Division Duplex (FDD) technique can be used, which carries out data transmission by using different frequency bands.

Layers of a radio interface protocol between a UE and a network can be classified into L1 (first layer), L2 (second layer), and L3 (third layer) based on the lower three layers of the Open System Interconnection (OSI) model widely accepted by communication systems.

The physical layer, which is the first layer, is connected to a Media Access Control (MAC) layer, located above the physical layer, through a transport channel. Data is transferred between the MAC layer and the physical layer through the transport channel. Data transfer between different physical layers, namely between the respective physical layers of transmitting and receiving sides, is performed through the physical channel. A few physical control channels are available for data transfer between physical layers.

A Physical Downlink Control Channel (PDCCH), which performs transfer of physical control information, informs the UE about resource allocation of a Paging Channel (PCH) and Downlink Shard Channel (DL-SCH) and Hybrid Automatic Repeat Request (HARQ) information related to the DL-SCH. The PDCCH transports a uplink grant which informs the UE about resource allocation of uplink transmission. A Physical Control Format Indicator Channel (PCFICH) informs the UE about the number of OFDM symbols used for PDCCHs and is transmitted for each subframe. A Physical Hybrid ARQ Indicator Channel (PHICH) transports a HARQ ACK/NACK signal in response to uplink transmission.

A Physical Uplink Control Channel (PUCCH) transports the HARQ ACK/NACK signal about downlink transmission, a scheduling request, and uplink control information such as Channel Quality Information (CQI). A Physical Uplink Shared Channel (PUSCH) transports a Uplink Shared Channel (UL-SCH).

The UE transmits a PUCCH or a PUSCH as follows.

The UE forms a PUCCH with respect to at least one of the information about Precoding Matrix Index (PMI) or Rank Indicator (RI) selected based on CQI or measured spatial channel information and transmit the PUCCH periodically to the BS. Also, the UE, after receiving downlink data, transmits Acknowledgement/Non-Acknowledgement (ACK/NACK) information about the received downlink data to the BS after a predetermined number of subframes. As one example, in case the UE receives downlink data at the n-th subframe, the UE transmits a PUCCH, which includes ACK/NACK information about the downlink data, at the (n+4)-th subframe. If the UE is incapable of transmitting all of the ACK/NACK information on the PUCCH allocated by the BS or the BS does not allocate the PUCCH through which the ACK/NACK information can be transmitted, the UE can transmit the ACK/NACK information through the PUSCH.

The radio datalink layer, which is the second layer, consists of an MAC layer, an RLC layer, and a PDCP layer. The MAC layer is responsible for mapping between a logical channel and a transport channel, selects an appropriate transport channel to transmit data transferred from the RLC layer, and adds necessary control information to the header of the MAC Protocol Data Unit (PDU). The RLC layer, located above the MAC layer, supports reliable transmission of data. Further, the RLC layer segments and concatenates RLC Service Data Units (SDUs) transferred from an upper layer so that data can be configured to have a size suitable for a wireless section. The RLC layer at a receiver supports a data reassembly function to restore the original RLC SDU from the received RLC PDUs. The PDCP layer is used only in a packet exchange region. To increase transmission efficiency of packet data in a radio channel, the PDCP layer can transmit data by compressing a header of an IP packet.

The Radio Resource Control (RRC) layer, the third layer, exchanges radio resource control information between the UE and the network along with a function of controlling a lower layer. Depending on a communication condition, the RRC state can be defined in various ways, such as an idle mode and RRC connected mode. In the RRC layer, various procedures related to radio resource management are defined, including a system information broadcasting procedure, RRC connection management procedure, multiple component carrier configuration procedure, radio bearer control procedure, security procedure, measurement procedure, and mobility management procedure (handover).

Carrier aggregation (CA) supports a plurality of component carriers and is alternatively called spectrum aggregation or bandwidth aggregation. An individual carrier wave grouped together by carrier aggregation is called a component carrier (in what follows, it is called CC). Each CC is defined by its bandwidth and center frequency. Carrier aggregation is employed to support growing throughput, prevent increase of costs due to broadband RF (Radio Frequency) devices, and ensure compatibility with the existing systems. For example, if five CCs are allocated with granularity of 5 MHz bandwidth for each carrier, a maximum of 25 MHz bandwidth can be supported.

Figure 2:
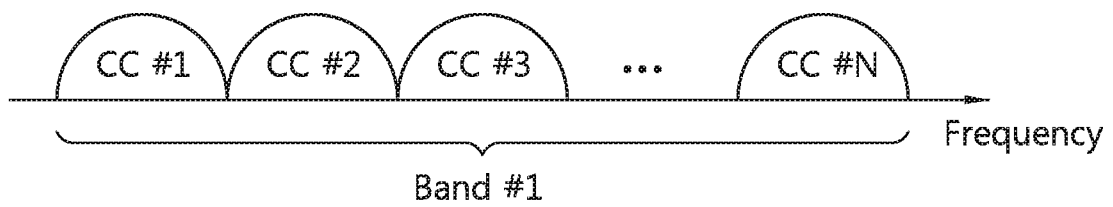
Figure 3:
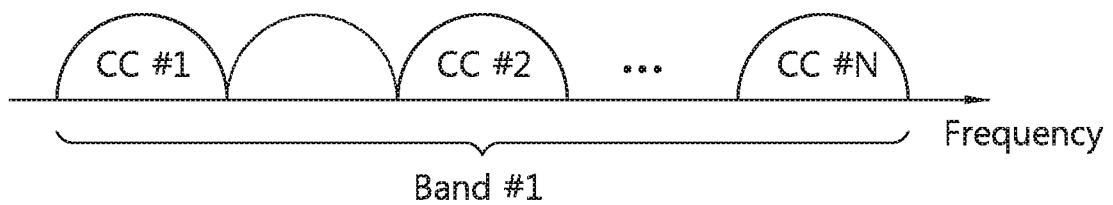
FIG. 3 illustrates intra-band non-contiguous carrier aggregation and FIG. 4 illustrates inter-band carrier aggregation.
Figure 4:
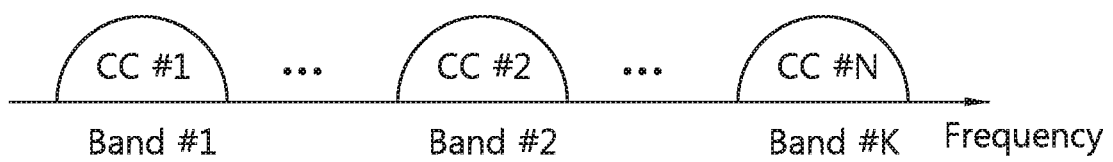

Carrier aggregation can be classified into intra-band contiguous carrier aggregation of FIG. 2, intra-band non-contiguous carrier aggregation of FIG. 3, and inter-band carrier aggregation of FIG. 4.

First of all, with reference to FIG. 2, intra-band contiguous carrier aggregation is carried out among contiguous CCs in the same band. For example, CC #1, CC #2, CC #3, . . . , CC #N, which are component carriers to be aggregated, are all contiguous to each other.

With reference to FIG. 3, intra-band non-contiguous carrier aggregation is performed for non-contiguous CCs. For example, CC #1 and CC #2, which are component carriers to be aggregated, are placed away from each other by a predetermined frequency.

With reference to FIG. 4, inter-band carrier aggregation refers to the situation where multiple component carriers exist and one or more component carriers are aggregated in a different frequency band. For example, among component carriers to be aggregated, CC #1 belongs to a band #1 while CC #2 belongs to a band #2.

The number of CCs aggregated can be set differently for downlink and uplink transmission. Symmetric aggregation refers to the case where the number of downlink CCs is the same as the number of uplink CCs, while asymmetric aggregation refers to the case whether the number of CCs for downlink transmission is different from that for uplink transmission.

Also, the size of CCs (namely, bandwidth) can be different from each other. For example, suppose five CCs are used to construct a frequency band of 70 MHz. Then, the frequency band of 70 MHz can be configured by using 5 MHz CC (carrier #0), 20 MHz CC (carrier #1), 20 MHz CC (carrier #2), 20 MHz CC (carrier #3), and 5 MHz CC (carrier #4).

A multiple component carrier system refers to a system supporting carrier aggregation. The multiple component carrier system can employ contiguous carrier aggregation or non-contiguous carrier aggregation. Also, either of symmetric and asymmetric aggregation can be used for the multiple component carrier system.

Figure 5:
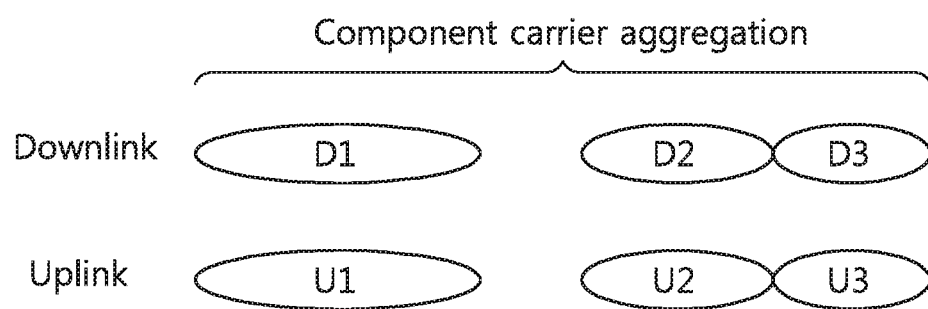
FIG. 5 illustrates linkage between a downlink component carrier and a uplink component carrier in a multiple component carrier system.

FIG. 5 illustrates linkage between a downlink component carrier and a uplink component carrier in a multiple component carrier system.

With reference to FIG. 5, as one example, a downlink component carrier (hereinafter, DL CC) D1, D2, and D3 are aggregated; and uplink component carrier (hereinafter, UL CC) U1, U2, and U3 are aggregated. At this time, Di is an index of DL CC while Ui is an index of UL CC (i=1, 2, 3). At least one DL CC is PCC and the others are SCC. It should be noted that the index does not necessarily correspond to an order of a component carrier or position of frequency band of the corresponding component carrier.

Meanwhile, at least one UL CC is PCC and the others are SCC. For example, D1 and U1 are PCC while D2, U2, and U3 are SCC.

At this time, the index of a primary component carrier can be set to 0, and one of the natural numbers can be an index of a secondary component carrier. Also, the index of the downlink or uplink component carrier can be set to the same index of a component carrier (or a serving cell) including the corresponding downlink or uplink component carrier. As another example, only the component carrier index or secondary component carrier index is defined, but an index for the downlink or uplink component carrier included in the corresponding component carrier may not be defined at all.

In an FDD system, one-to-one linkage can be established between the DL CC and UL CC. For example, D1 is one-to-one liked to U1 while D2 to U2; and D3 to U3. Through the system information transmitted by a logical channel BCCH or a UE-specific RRC message transmitted by a DCCH, the UE establishes linkage among the DL CCs and the UL CCs. Such linkage is called System Information Block (SIB) 1 linkage or SIB2 linkage. The UE can establish linkage in a cell-specific manner or UE-specific manner. As one example, the primary component carrier is configured in a cell-specific manner while the secondary component carrier is configured in a UE-specific manner. At this time, one-to-one, one-to-n, or n-to-one linkage can be established between the downlink component carrier and the uplink component carrier.

A downlink component carrier corresponding to a Primary Serving Cell (PSC) is called a Downlink Primary Component Carrier (DL PCC) while a uplink component carrier corresponding to the PSC is called a Uplink Primary Component Carrier (UL PCC). Similarly, in the case of downlink transmission, a component carrier corresponding to a Secondary Serving Cell (SSC) is called a Downlink Secondary Component Carrier (DL SCC) while, in the case of uplink transmission, a component carrier corresponding to the secondary serving cell is called a Uplink Secondary Component Carrier (UL SCC). One serving cell may include only the DL CCs or both of DL CCs and UL CCs.

The primary serving cell and the secondary serving cell are characterized as follows.

First, the primary serving cell is used for transmission of the PUCCH.

Second, the primary serving cell is always activated whereas the secondary serving cell is a carrier activated or deactivated depending on a particular condition.

Third, when the primary serving cell experiences a Radio Link Failure (RLF), RRC re-connection is triggered, but when the secondary serving cell experiences the RLF, RRC re-connection is not triggered.

Fourth, the primary serving cell can be changed when a security key is changed or by a handover procedure which accompanies a Random Access Channel (RACH) procedure. It should be noted that in the case of MSG4 (contention resolution), only the PDCCH which commands the MSG4 has to be transmitted through the primary serving cell and MSG4 information can be transmitted through the primary serving cell or the secondary serving cell.

Fifth, Non-Access Stratum (NAS) information is received through the primary serving cell.

Sixth, in the primary serving cell, the DL PCC and the UL PCC always form a pair.

Seventh, each UE can set a different component carrier as the primary serving cell.

Eighth, the RRC layer can carry out a procedure such as reconfiguration, adding, and removal of the secondary serving cell. In adding a new secondary serving cell, RRC signaling can be used to transmit system information of a dedicated secondary serving cell.

The technical principles of the present invention related to the characteristics of the primary and the secondary serving cell are not necessarily limited to those described above, but the descriptions above are only an example and further examples can be included within the technical principles of the present invention.

A plurality of serving cells can be configured for a single UE. For example, the UE can be configured for the primary serving cell and one secondary serving cell, or for the primary serving cell and a plurality of secondary serving cells. And a plurality of serving cells configured for the UE can transmit a uplink channel simultaneously or in parallel fashion. At this time, the uplink channel comprises a PUCCH, PUSCH, and PRACH. A RACH is mapped to the PRACH. The following illustrates an example where a plurality of uplink channels is transmitted in parallel on a plurality of serving cells. As one example, the PUCCH and the PRACH can be transmitted in parallel to the primary and the secondary serving cell, respectively. As another example, the PUSCH and the PRACH can be transmitted in parallel to the primary and the secondary serving cell, respectively.

To transmit a plurality of uplink channels on a plurality of serving cells, the UE requires power enough to transmit the plurality of uplink channels. However, it is often the case that maximum transmission power allocated to the UE is limited and is not enough to transmit all the uplink channels. For example, suppose the maximum transmission power allocated to the UE is 10 W and 7 W and 5 W are needed to transmit the PUSCH and the PRACH respectively to the primary serving cell and the secondary serving cell. Since transmission power of the PUSCH and the PRACH amounts to 12 W in total, 2 W is still needed to get the maximum transmission power. Therefore, less power than required is allocated to either of the PUSCH and the PRACH. To solve the problem above, the UE can allocate given uplink transmission power to each channel based on a priority order, which is called a power allocation priority.

As one example, the UE allocates power of 10 W to either of the PUSCH and the PRACH and allocates the remaining power for transmission of other channel. For example, in case the PUSCH has a high priority, the UE first allocates 7 W to the PUSCH and allocates the remaining 3 W to the transmission of the PRACH. In this case, the power required for transmission of the PUSCH is all allocated, but the power less than the required for transmission of the PRACH by 2 W is allocated. On the other hand, in case the PRACH has a high priority, the UE first allocates 5 W to the PRACH and allocates the remaining 5 W to transmission of the PUSCH. In this case, the power less than the required for transmission of the PUSCH by 2 W, but all of the power required for transmission of the PRACH is allocated.

The power allocation priority has been described with an example of using only the PUSCH and the PRACH, the power allocation priority can be assigned to all of physical uplink channels such as the PUCCH, PUSCH, PRACH, and SRS.

One factor which determines the power allocation priority is channel reliability. A higher power allocation priority is assigned to the channel for which higher reliability needs to be secured. With more power a signal is transmitted, with more reliability the signal can be received.

First, regarding reliability between the PUSCH and the PRACH, since the BS is capable of detecting Discontinuous Transmission (DTX) with respect to the PUSCH, system performance does not change much even if the reliability of the PUSCH is low. On the other hand, if the BS fails to detect the PRACH, system performance can be degraded as the BS is then unable to respond promptly to the UE's request for uplink transmission resources. In other words, the PRACH requires higher reliability than the PUSCH, and a higher power allocation priority can be assigned to the PRACH. However, in case at least one of ACK/NACK signal, Channel Quality Information (CQI), and a rank indicator is transmitted through the PUSCH, the PUSCH can have an exceptionally higher power allocation priority than the PRACH.

Second, regarding reliability between the PUCCH and the PRACH, since the PUCCH carries primary control information such as the ACK/NACK signal, channel state information, and rank indicator, the PUCCH has a higher reliability than the PRACH. This is so because if the BS fails to receive the ACK/NACK signal with respect to downlink data, downlink transmission or re-transmission is delayed successively, thereby causing system performance degradation. Therefore, of the PUCCH and the PRACH, the PUCCH has a higher power allocation priority.

Third, a Sounding Reference Signal (SRS) has the lowest power allocation priority when compared with a physical uplink channel. The SRS is a reference signal used for uplink scheduling. The UE sends the SRS to a uplink channel, and the BS performs scheduling for uplink transmission after checking the uplink channel state from the SRS.

In what follows, Power Headroom (PH) is described in detail. PH denotes power left for the UE to use in addition to the power used for current uplink transmission. For example, suppose the maximum transmission power for the UE is 10 W and the UE is currently using 9 W of power in the frequency band of 10 MHz. Since the UE can use additional power of 1 W, the power headroom becomes 1 W.

At this time, if the BS allocates a frequency band of 20 MHz to the UE, power of 18 W (=9 W×2) is required. Since the maximum transmission power of the UE is 10 W, however, either the UE cannot utilize the whole frequency band of 20 MHz or the BS cannot receive the UE's signal reliably because of lack of power of the UE. To solve this problem, if the UE report to the BS that the PH is 1 W, the BS can perform additional scheduling in the range of the PH. The report is called Power Headroom Report (PHR).

PH is defined as a difference between the maximum transmission power $P_{cmax}$ configured for the UE and estimated power $P_{estimated}$ with respect to uplink transmission as shown in Eq. 1 and is expressed in units of dB.

$$P_{PH} = P_{cmax} - P_{estimated} [dB] \quad \text{[Equation 1]}$$

In other words, power headroom $P_{PH}$ is obtained as the power left from the maximum transmission power of the UE allocated by the BS by excluding the $P_{estimated}$ which is a sum of transmission power used by individual serving cells. Meanwhile, the maximum transmission power can be defined for each of the serving cells; for example, the maximum transmission power of a serving cell c is represented by $P_{cmax, c}$.

As one example, $P_{estimated}$, equals the power $P_{PUSCH, c}$ estimated with respect to transmission of the PUSCH in the serving cell c. Therefore, in this case, the PH can be obtained by using Eq. 2. Equation 2 is related to the case where only the PUSCH is transmitted through uplink transmission of the serving cell c, which is denoted as a type 1. The PH according to the type 1 is denoted by type 1 PH $P_{PH, c\text{-}type1}$.

$$P_{PH,c\text{-}type1} = P_{cmax,c} - P_{PUSCH,c} [dB] \quad \text{[Equation 2]}$$

As another example, $P_{estimated, c}$ equals a sum of the power $P_{PUSCH, c}$ estimated with respect to transmission of the PUSCH in the serving cell c and the power $P_{PUCCH, c}$, estimated with respect to transmission of the PUCCH. Therefore, in this case, the PH can be obtained by using Eq. 3. Equation 3 is related to the case where the PUSCH and the PUCCH are transmitted through uplink transmission of the serving cell c at the same time, which is denoted as type 2. The PH according to the type 2 is denoted by type 2 PH $P_{PH, c\text{-}type2}$. At this time, the serving cell c includes the primary serving cell.

$$P_{PH,c\text{-}type2} = P_{cmax,c} - P_{PUCCH,c} - P_{PUSCH,c} [dB] \quad \text{[Equation 3]}$$

Figure 6:
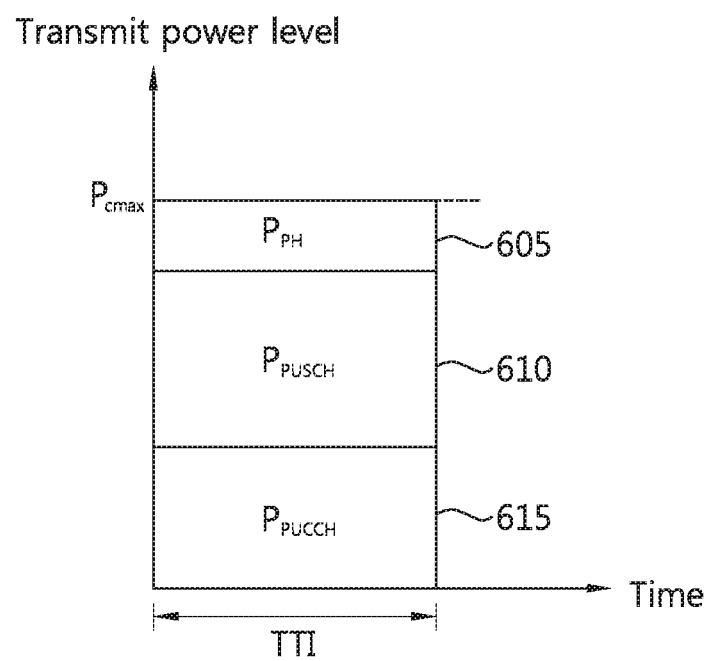
FIG. 6 illustrates one example of a graph showing power headroom of the present invention along time-frequency axis.

FIG. 6 illustrates a graph showing PH according to Eq. 3 along time-frequency axis. FIG. 6 shows the PH with respect to one serving cell c.

With reference to FIG. 6, the maximum transmission power $P_{cmax}$ configured for the UE consists of $P_{PH}$ 605, $P_{PUSCH}$ 610, and $P_{PUCCH}$ 615. In other words, the remaining power from $P_{cmax}$ by excluding the $P_{PUSCH}$ 610 and the $P_{PUCCH}$ 615 is defined as $P_{PH}$ 605. Each of the power values is calculated in units of Transmission Time Interval (TTI).

The primary serving cell is the only serving cell holding a UL PCC capable of transmitting the PUCCH.

Since the secondary serving cell is incapable of transmitting the PUCCH, the PH is determined according to Eq. 2, but parameters and operations of a method for reporting power headroom determined by Eq. 3 are not defined. On the other hand, the operation and the parameters of a method for reporting power headroom determined by Eq. 3 can be defined in the primary serving cell. In case the UE has to transmit the PUSCH in the primary serving cell by receiving a uplink grant from the BS and the PUCCH is transmitted simultaneously to the same subframe according to a predetermined rule, the UE calculates the PH values according to Eqs. 2 and 3 at the time the PHR is triggered and transmits the calculated PH values to the BS.

If the maximum transmission power is sufficiently large and the power headroom according to Eq. 2 or 3 is larger than 0 dB, it causes no problem to transmit a plurality of physical uplink channels or SRS at the same time to a plurality of serving cells. In this case, there is no need to apply the power allocation priority.

The power allocation priority becomes important when the power headroom gets smaller than 0 dB as the UE transmits the PRACH in parallel on a second serving cell at the time of transmitting the PUCCH, PUSCH, SRS, or PUCCH and PUSCH on a first serving cell. For example, in case the UE transmits the PUSCH to the first serving cell, the power headroom is calculated according to Eq. 2. In case the UE also has to transmit the PRACH to the second serving cell, however, the maximum transmission power $P_{cmax}$ is decreased as much as the transmission power of the PRACH. This is so because the power coordination value, which is a parameter to reduce the size of the maximum transmission power $P_{cmax}$, becomes large due to the PRACH. If $P_{cmax}$ is reduced in Eq. 2, the magnitude of the power headroom gets smaller than 0 dB.

At this time, according to the power allocation priority, the UE has to selectively transmit either of the PUSCH and the PRACH or transmit both of the PUSCH and the PRACH, but has to reduce transmission power of either of the two channels.

Figure 7:
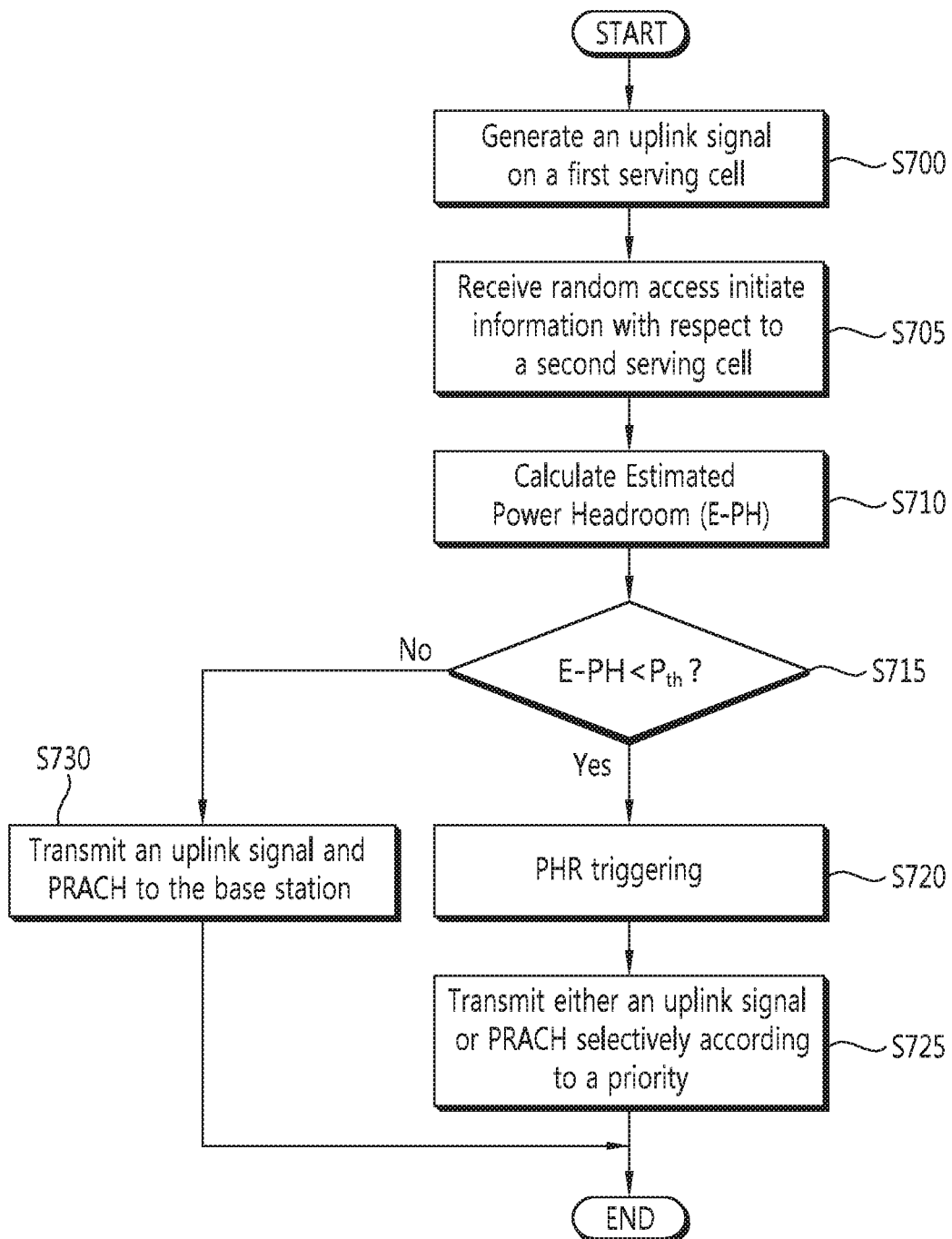
FIG. 7 is a flow diagram illustrating a method for controlling uplink transmission power by a user equipment according to one example of the present invention.

FIG. 7 is a flow diagram illustrating a method for controlling uplink transmission power by a user equipment according to one example of the present invention.

With reference to FIG. 7, the UE generates an uplink signal scheduled to be transmitted on a first serving cell of a first subframe S700. The uplink signal includes, for example, a physical uplink channel or SRS. The physical uplink channel includes at least one of the PUSCCH and the PUSCH. Two or more serving cells are assigned to the UE, and the first serving cell includes the primary serving cell.

The UE receives from the BS random access initiate information which commands initiation of a random access procedure on a second serving cell of the first subframe S705. The random access initiate information is related to a second serving cell. The random access initiate information is defined in a form similar to Downlink Control Information (DCI). The DCI is mapped to the PDCCH and transmitted from the BS to the UE, which can be called a PDCCH order. The DCI can be a DCI format 1A, which is defined as shown in the following table.

TABLE 1

Carrier Indicator Field (CIF) - 0 or 3 bits.
Flag for identifying format 0/1A - 1 bit (format 0 in the case of 0 and format 1A in the case of 1)
In case format 1A CRC is scrambled with C-RNTI and the remaining fields are configured as described below, the format 1A is used for the random access procedure initiated by the PDCCH order.
The following -
Localized/Distributed VRB allocation flag - 1 bit. The flag is set to 0.
Resource block allocation: $\lceil \log_2(N_{RB}^{DL}(N_{RB}^{DL} + 1)/2 \rceil$ bits.
All of the bits are set to 1.
Preamble Index - 6 bits
PRACH mask index - 4 bits
All of the remaining bits of the format 1A intended to allocate a simplified schedule of one PDSCH codeword are set to 0.

With reference to Tale 1, depending on a value of the preamble index, the random access procedure initiated by an order of the BS can be carried out in a contention based manner or in a non-contention based manner. As one example, if six bits of the preamble index information are all set to "0", a contention-based random access procedure is carried out. For example, if the preamble index is 000000, the UE selects an arbitrary preamble and sets a PRACH mask index to "0" and transmits the PRACH. The PRACH mask index represents information about time/frequency resources available. The information about time/frequency resources available represents different resources according to a Frequency Division Duplex (FDD) system and a Time Division Duplex (TDD) system.

The second serving cell includes the secondary serving cell. This is so because the UE is incapable of initiating the random access procedure in the secondary serving cell autonomously and the random access procedure can be started only when a random access initiate indicator is received. In this case, the Cell Indicator Field (CIF) of Table 1 indicates the second serving cell where the random access procedure is supposed to be initiated. The execution order of the steps of S700 and S705 can be changed, or the steps can be carried out simultaneously.

The UE calculates Estimated-PH (E-PH) estimated in the first subframe S710. The E-PH includes type 1 PH and type 2 PH. The type 1 PH is calculated by Eq. 1 while the type 2 PH is calculated by Eq. 2.

The UE determines whether the E-PH is less than threshold power $P_{th}$ S715. The threshold power can be 0 dB. For example, if the UE is supposed to transmit the PUSCH only, the UE checks whether the type 1 PH is less than 0 dB. If the UE is supposed to transmit the PUSCH together with the PUCCH, the UE checks whether the type 0 PH is less than 0 dB. Determination by the UE about whether the E-PH is less than 0 dB is equivalent to determining existence of a serving cell where the E-PH in the first subframe which transmits a PRACH is set to a value less than 0 dB.

If the E-PH is less than threshold power, the UE triggers a PHR S720. The PHR is triggered when i) E-PH is less than the threshold power, ii) a periodic timer terminates, iii) an estimate of Path Loss (PL) varies more than a predetermined reference value, or iv) a random access procedure indicator with respect to the secondary serving cell is received. Since PH varies often, a periodic power headroom reporting method can be used. If the periodic timer terminates while the periodic power headroom reporting method is adopted, the UE triggers power headroom reporting. When the power headroom is reported, the UE re-activates the periodic timer. Also, in case the path loss estimate measured by the UE varies more than a predetermined reference value, power headroom reporting can be triggered. The path loss estimate is measured by the UE on the basis of Reference Symbol Received Power (RSRP). According to one embodiment of the present invention, the step of S720 can be skipped depending on the situations. In this case, if the estimated power headroom is less than threshold power, the step of S725 is carried out immediately. The execution order of the steps of S720 and S725 can be changed, or the steps can be carried out simultaneously. In this case, the serving cells included in the power headroom report can be confined to those serving cells activated at a subframe at which the power headroom report is measured or those activated serving cells for which valid uplink time arrangement values have been secured.

The UE transmits either of the uplink signal and the PRACH selectively from a first subframe to the BE according to a priority order between the two S725. For example, if the uplink signal has a power allocation priority higher than the PRACH, the UE transmits the uplink signal to the first serving cell of the first subframe. On the other hand, if the PRACH has a power allocation priority higher than the uplink signal, the UE transmits the PRACH to the second serving cell of the first subframe. At this time, the UE does not transmit the other one which has a lower power allocation priority.

Again, at the step of S715, if the estimated power headroom is larger than or equal to threshold power, the UE transmits the uplink signal to the first serving cell of the first subframe while the UE transmits the PRACH to the second serving cell of the first subframe S730.

As described above, if the uplink signal is transmitted selectively according to a power allocation priority in a multiple component carrier system, uplink transmission power can be distributed in an efficient manner. Also, since power allocation is carried out according to a simple and clear rule, system complexity can be reduced, and thus system performance can be improved.

Figure 8:
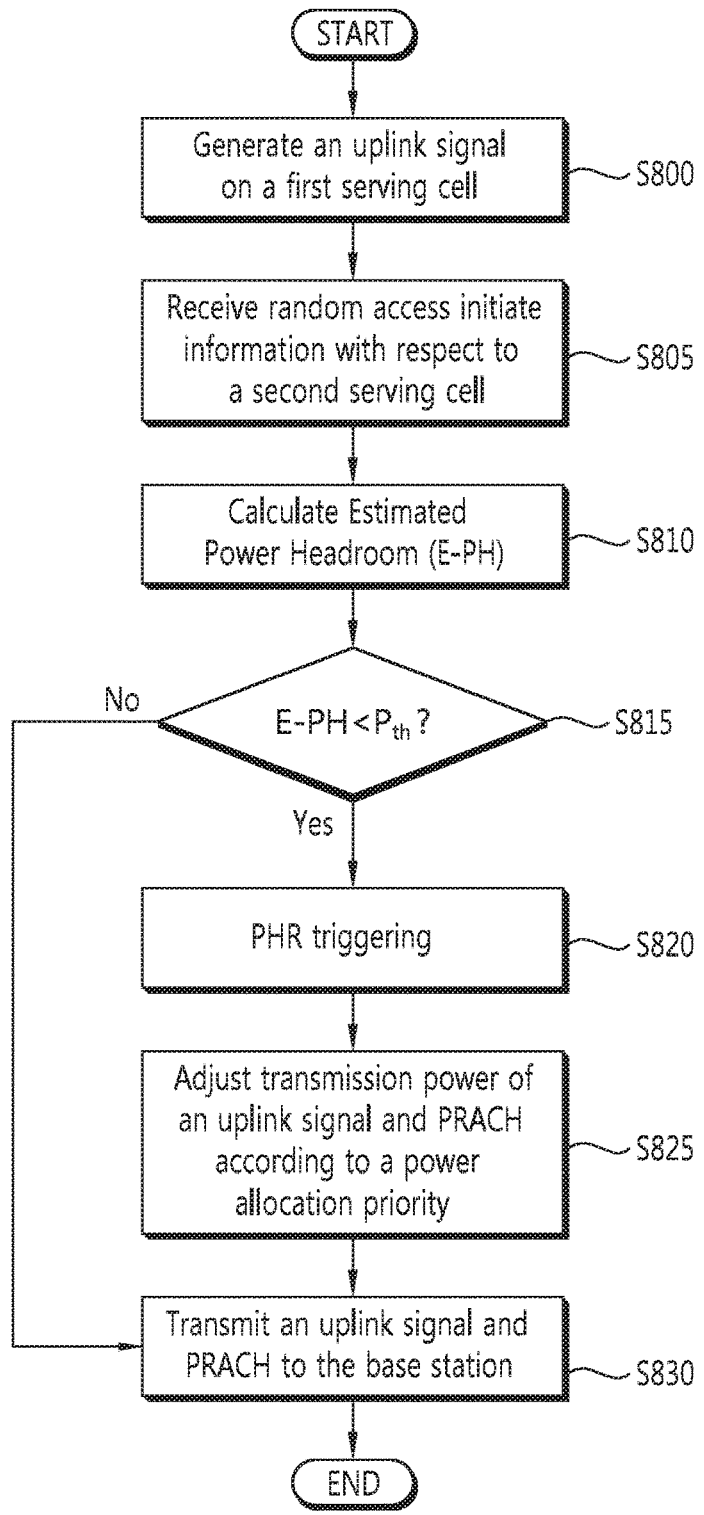
FIG. 8 is a flow diagram illustrating a method for controlling uplink transmission power by a user equipment according to another example of the present invention.

FIG. 8 is a flow diagram illustrating a method for controlling uplink transmission power by a user equipment according to another example of the present invention.

With reference to FIG. 8, the UE generates an uplink signal scheduled to be transmitted on a first serving cell of a first subframe S800. The uplink signal includes, for example, a physical uplink channel or SRS. The physical uplink channel includes at least one of the PUSCCH and the PUSCH. Two or more serving cells are assigned to the UE, and the first serving cell includes the primary serving cell.

The UE receives from the BS random access initiate information which commands initiation of a random access procedure on a second serving cell of the first subframe S805. The random access initiate information is related to a second serving cell. The random access initiate information is defined in a form similar to the DCI. The DCI is mapped to the PDCCH and transmitted from the BS to the UE, which can be called a PDCCH order. The DCI can be a DCI format 1A, which is defined as shown in Table 1. The second serving cell includes a secondary serving cell. The execution order of the steps of S800 and S805 can be changed, or the steps can be carried out simultaneously.

The UE calculates Estimated-PH (E-PH) estimated in the first subframe S810. The E-PH includes type 1 PH and type 2 PH. The type 1 PH is calculated by Eq. 1 while the type 2 PH is calculated by Eq. 2.

The UE determines whether the E-PH is less than threshold power $P_{th}$ S815. The threshold power can be 0 dB. For example, if the UE is supposed to transmit the PUSCH only, the UE checks whether the type 1 PH is less than 0 dB. If the UE is supposed to transmit the PUSCH together with the PUCCH, the UE checks whether the type 0 PH is less than 0 dB. Determination by the UE about whether the E-PH is less than 0 dB is equivalent to determining existence of a serving cell where the E-PH in the first subframe which transmits a PRACH is set to a value less than 0 dB.

If the E-PH is less than threshold power, the UE triggers a PHR S820. In other words, the case where the E-PH is less than threshold power corresponds to a triggering condition for a power headroom report. According to one embodiment of the present invention, the step of S820 can be omitted depending on the needs. In this case, if the E-PH is less than threshold power, the step of S825 can be carried out immediately. The execution order of the steps of S820 and S825 can be changed, or the steps can be carried out simultaneously.

The UE adjusts transmission power to be allocated to the uplink signal and the PRACH respectively according to a power allocation priority S825. For example, if the priority of the uplink signal is lower than that of the PRACH, the UE adjusts transmission power of the uplink signal. More specifically, transmission power of a signal or a channel having a low power allocation priority is adjusted on the basis of Table 2.

TABLE 2

| First serving cell | Second serving cell | Power allocation priority |
|---|---|---|
| PUSCH | PRACH | PRACH > PUSCH |
| PUSCH-(including ACK/NACK signal, CQI or RI) | | PUSCH > PRACH |
| PUCCH | | PUCCH > PRACH |
| SRS | | PRACH > SRS |

With reference to Table 2, the power allocation priority of the PRACH is higher than that of the PUSCH, but in case the ACK/NACK signal is included, the power allocation priority of the PUSCH is higher than that of the PRACH. Also, in case CQI or RI is included in the PUSCH, the power allocation priority of the PUSCH can be higher than that of the PRACH. The power allocation priority of the PUCCH is higher than that of the PRACH, and the PRACH has a higher power allocation priority than SRS. Table 2 defines power allocation priorities between two channels in two serving cells, but Table 2 is only an example and the power allocation priority can be applied equally to the case of three or more channels in three or more serving cells.

In case three or more channels different from each other are commanded to perform transmission through different serving cells, in other words, in case the PUCCH, PUSCH, and PRACH are transmitted simultaneously through a first, second, and third serving cell, respectively; or the PUCCH and PUSCH are transmitted simultaneously through the first serving cell, and the PRACH is transmitted through the second serving cell, the PUCCH always has a higher priority than the PUSCH.

Transmission power of the uplink signal is adjusted to a value $P'_{CH, type1}$ or $P'_{PH, c-type2}$ specified by the estimated power headroom. For example, P'PH, c-type1 can be 0 dB. Adjusting transmission power of a signal or a channel having a low power allocation priority includes reducing transmission power of a signal or a channel having a low power allocation priority. As one example, Eq. 2 is modified to Eq. 4 while Eq. 3 is modified to Eq. 5. This modification reflects the case where the uplink signal has a lower power allocation priority than the PRACH.

$$P'_{PH,c\text{-}type1} = P_{cmax,c} - P'_{PUSCH,c} \qquad [\text{Equation 4}]$$

$$P'_{PH,c\text{-}type2} = P_{cmax,c} - P'_{PUCCH,c} - P_{PUSCH,c}[\text{dB}] \qquad [\text{Equation 5}]$$

In other words, the UE reduces transmission power of a signal having a low priority to $P'_{PUSCH, c}$ or $P'_{PUCCH, c}$, thereby adjusting estimated power headroom to become $P'_{PH, c\text{-}type1}$ or $P'_{PH, c\text{-}type2}$. At this time, is an index of a serving cell and it is equal to 1 (c=1) since an uplink signal is transmitted through the first serving cell. In the case of the primary serving cell, c can be zero (c=0) according to a definition of the serving cell index value.

As another example, Eq. 2 is modified to Eq. 6 while Eq. 3 is modified to Eq. 7. This modification reflects the case where the PRACH has a lower power allocation priority than the uplink signal. At this time, c is an index of a serving cell and it is equal to 1 (c=1) since an uplink signal is transmitted through the first serving cell. In the case of the primary serving cell, c can be zero (c=0) according to a definition of the serving cell index value.

$$P'_{PH,c\text{-}type1} = P'_{cmax,c} - P_{PUSCH,c}[\text{dB}] \qquad [\text{Equation 6}]$$

$$P'_{PH,c\text{-}type2} = P'_{cmax,c} - P_{PUCCH,c} - P_{PUSCH,c}[\text{dB}] \qquad [\text{Equation 7}]$$

In other words, the UE reduces transmission power of the PRACH having a low priority so that the maximum transmission power becomes $P'_{cmax, c}$. In this way, the UE adjusts estimated power headroom to become $P'_{PH, c\text{-}type1}$ or $P'_{PH, c\text{-}type2}$.

The relationship between reduction of transmission power of the PRACH and reduction of the maximum transmission power can be determined by the following equation.

The maximum transmission power ranges from the minimum value $P_{cmax\_L, c}$ to the maximum value $P_{cmax\_H, c}$. Power management Maximum Power Reduction (PMPR) is used as a parameter to determine the minimum value $P_{cmax\_L, c}$. $P_{cmax\_L, c}$ is defined as the following equation.

$$P_{cmax\_L,c} = \text{MIN}[P_{Emax,c} - \Delta T_{C,c}, P_{powerclass} - \text{MAX}[MPR_c + AMPR_c + PMPR_c] - \Delta T_{C,c}] \qquad [\text{Equation 8}]$$

With reference to Eq. 8, $PMPR_c$ is a power backoff value (P-MPR) in a serving cell c. MIN[a, b] represents a smaller value between a and b, and $P_{Emax, c}$ represents the maximum power determined by RRC signaling of the BS in the serving cell c. $\Delta T_{C, c}$ is an amount of power applied at the edge of the corresponding frequency band in the case of uplink transmission, which can be 1.5 dB or 0 dB depending on the frequency bandwidth. $P_{powerclass}$ is a power value according to a few power classes defined for supporting specifications of various types of UEs in a multiple component carrier system. In general, the LTE system supports power class 3, and $P_{powerclass}$ according to the power class 3 is 23 dBm. $MPR_c$ is an amount of maximum power reduction in the serving cell c, and Additional MPRc (AMPRc) is an additional amount of maximum power reduction signaled by the BS in the serving cell c.

As described above, the maximum transmission power $P_{cmax, c}$ in each serving cell is changed by the PMPRc. If the maximum transmission power $P_{cmax, c}$ in each serving is changed, power headroom is eventually changed, too.

As one example, the following equation determines PMPR of a serving cell.

$$PMPR_c = \frac{\sum P_{cmax\_etc} + P_{PRACH}}{N - M} + EMPR_c, \qquad [\text{Equation 9}]$$

where $PMPR_c$ is PMPR of a serving cell c; $\Sigma P_{cmax\_etc}$ is a total sum of current transmission power of a wireless communication system excluding the LTE system; $P_{PRACH}$ is a transmission power value to be allocated to the PRACH that can be transmitted in the random access procedure; EMPRc is an additional maximum transmission power reduction value (E-MPR) to reduce a unique emission effect due to the LTE frequency band of the corresponding serving cell c. N is the number of serving cells including the UL CC, allocated to the UE which has received random access initiate information in an arbitrary, active serving cell; and M is the number of serving cells within a Timing Alignment Group (TAG) which has failed to secure a valid Timing Alignment (TA) value or which has secured the TA value, validity of which has been expired. In other words, N-M represents the number of serving cells included in the TAGs which have secured valid TA values among serving cells including the UL CC allocated to the UE which has received a PDCCH command in an arbitrary, active serving cell.

As another example, the transmission power value $P_{PRACH}$ to be allocated to the PRACH that can be transmitted during the random access procedure can be determined on the basis of preamble received target power. Taking account of an estimate of the UE's downlink path loss, $P_{PRACH}$ can be determined by the following equation so that it may not exceed the Pcmax, c value.

$$P_{PRACH}=\min[P_{cmax,c}(i), \text{PRTP}+PL_c][\text{dB}] \quad \text{[Equation 10]}$$

where $P_{cmax,c}(i)$ is transmission power of the UE configured with respect to a subframe i of a serving cell; and $PL_c$ is an estimate of the UE's downlink path loss with respect to the serving cell. PRTP is preamble received target power.

The UE, based on a power allocation priority, can reduce $P_{PRACH}$, which denotes transmission power of the PRACH having a low priority, and accordingly, PMPR is reduced, thereby eventually reducing $P_{cmax,c}$.

On the other hand, the $P_{PRACH}$ value may not be reflected in the PMPR value, but can be defined as a value affecting $P_{cmax,c}$ value directly. In other words, the $P_{PRACH}$ can be defined so that the $P_{cmax,c}$ reduces the $P_{PRACH}$ by $P_{PRACH}/(N-M)$ directly with respect to the serving cells which have been activated and have secured uplink time alignment values. The UE transmits the uplink signal to the BS through a first serving cell of a first subframe based on adjusted transmission power and transmits the PRACH through a second serving cell of the first subframe S830. In the case of a low power allocation priority, too, the uplink signal or the PRACH can be transmitted with reduced transmission power.

Again, at the step of S815, if the estimated power headroom is larger than or equal to threshold power, the UE transmits the uplink signal to the first serving cell of the first subframe without adjustment of transmission power while the UE transmits the PRACH to the second serving cell of the first subframe S830.

In this manner, at the time of transmitting an uplink signal in a multiple component carrier system, if transmission power of each physical uplink channel or signal is adjusted according to a power allocation priority, transmission of a particular signal can be all transmitted without being dropped.

Figure 9:
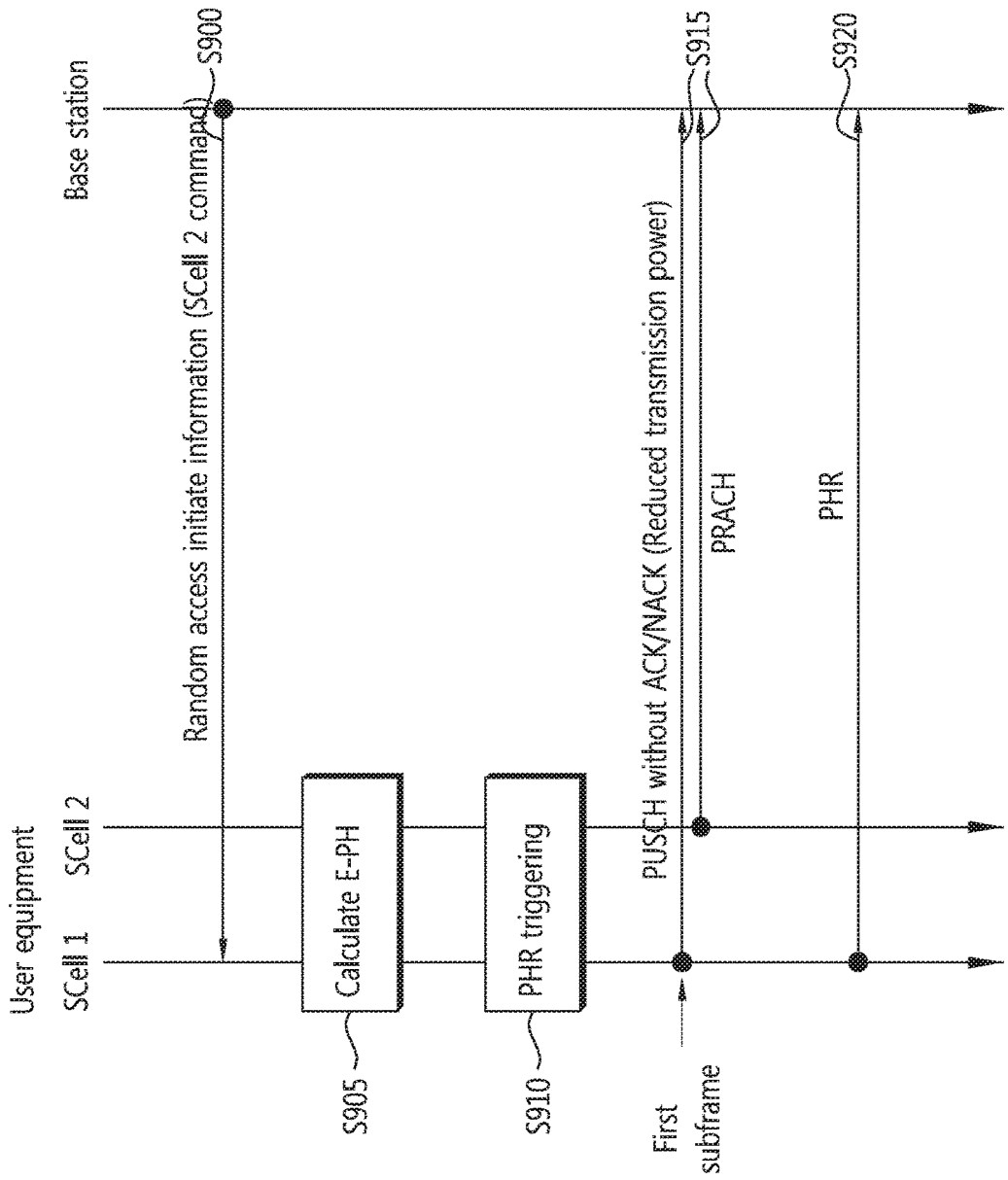
FIG. 9 is a flow diagram illustrating a method for controlling uplink transmission power according to one example of the present invention.

FIG. 9 is a flow diagram illustrating a method for controlling uplink transmission power according to one example of the present invention.

With reference to FIG. 9, the BS transmits a random access initiate information on a second serving cell of a first subframe, which commands initiation of a random access procedure, to the UE S900. A first serving cell SCell 1 and a second serving cell SCell 2 are linked to the UE, and in this example, the random access initiate information is transmitted to the first serving cell. The random access initiate information can also be transmitted to the second serving cell. The random access initiate information includes a DCI format 1A as shown in Table 1 and a cell index field specifies the second serving cell. At this time, the first serving cell can be the primary serving cell, and the second serving cell can be the secondary serving cell.

The UE calculates Estimated-PH (E-PH) S905. The E-PH includes type 1 PH and type 2 PH. The type 1 PH is calculated by Eq. 1 while the type 2 PH is calculated by Eq. 2. At this time, it is assumed that the E-PH is less than a particular value (for example, 0 dB).

Since the E-PH is less than a particular value, the UE triggers a Power Headroom Report (PHR) S910.

If there exist a PUSCH to be transmitted to the first serving cell of the first subframe, the UE determines a power allocation priority between the PUSCH and a PRACH to be transmitted to the second serving cell. For example, if the PUSCH includes none of the ACK/NACK signal, CQI, and RI, the UE determines that the PUSCH has a lower priority than the PRACH and reduces transmission power of the PUSCH according to Eq. 4 so that the E-PH becomes 0 dB. And the UE transmits the PUSCH to the BS through the first serving cell of the first subframe by using reduced transmission power and transmits the PRACH to the BS through the second serving cell of the first subframe by using the originally scheduled transmission power S915.

Next, the UE transmits the PHR to the BS S920. This is intended to inform the BS that the PH is less than 0 dB so that the BS performs again the random access initiation or uplink scheduling.

Figure 10:
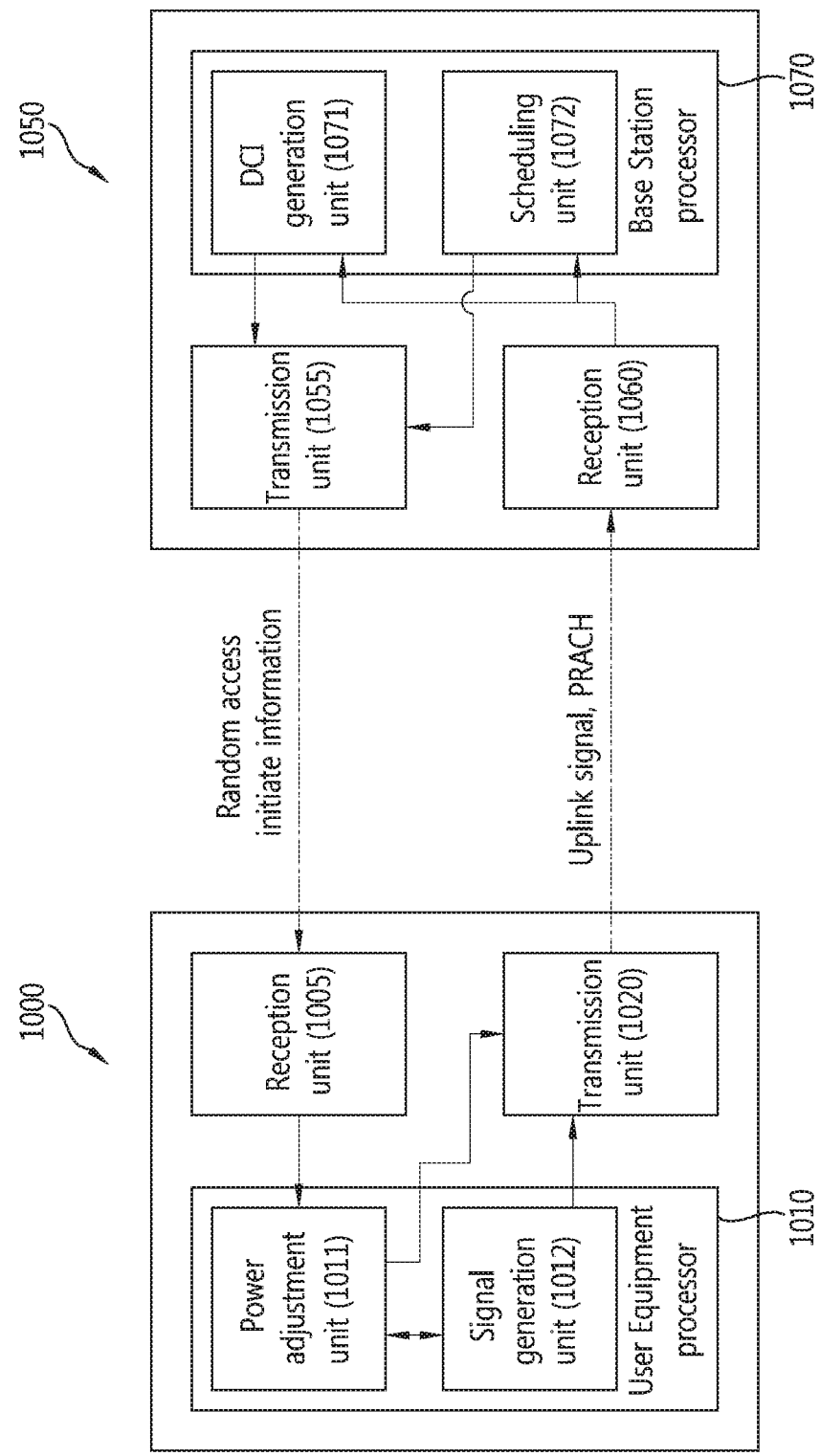
FIG. 10 is a block diagram illustrating a user equipment and a base station controlling uplink transmission power according to one example of the present invention.

FIG. 10 is a block diagram illustrating a user equipment and a base station controlling uplink transmission power according to one example of the present invention.

With reference to FIG. 10, the UE 1000 comprises a reception unit 1005, a UE processor 1010, and a transmission unit 1020. The UE processor 1010 again comprises a power adjustment unit 1011 and a signal generation unit 1012.

The reception unit 1005 receives random access initiate information from the BS 1050. The random access initiate information is related to a second serving cell established for the UE 1000. The random access initiate information includes Downlink Control Information (DCI). The DCI is mapped to the PDCCH and transmitted from the BS to the UE, which can be called a PDCCH order. The DCI can be a DCI format 1A, which can be defined as shown in Table 1.

The power adjustment unit 1011 calculates Estimated-PH (E-PH) estimated in the first subframe. At this time, the first subframe denotes a time interval through which a physical uplink channel or signal is transmitted to the first and the second serving cell configured for the UE 1000. The E-PH includes type 1 PH and type 2 PH. The type 1 PH is calculated by Eq. 1 while the type 2 PH is calculated by Eq. 2.

The power adjustment unit 1011 determines whether the E-PH is less than threshold power $P_{th}$. The threshold power can be 0 dB. For example, if the UE 1000 is supposed to transmit the PUSCH only, the power adjustment unit 1011 checks whether the type 1 PH is less than 0 dB. If the UE 1000 is supposed to transmit the PUSCH together with the PUCCH, the UE checks whether the type 0 PH is less than 0 dB. Determination by the power adjustment unit 1011 about whether the E-PH is less than 0 dB is equivalent to determining existence of a serving cell where the E-PH in the first subframe which transmits a PRACH is set to a value less than 0 dB.

If the E-PH is less than threshold power, the signal generation unit 1012 triggers a PHR. In other words, the case where the E-PH is less than threshold power corresponds to a triggering condition for a power headroom report.

The signal generation unit 1012 generates the uplink signal and the PRACH. The uplink signal includes at least one of the PUSCH, PUCCH, and SRS. The uplink signal is scheduled to be transmitted to the first serving cell while the PRACH is scheduled to be transmitted to the second serving cell.

The power adjustment unit 1011 adjusts transmission power to be allocated to the uplink signal and the PRACH respectively according to a power allocation priority. For example, if the priority of the uplink signal is lower than that of the PRACH, the power adjustment unit 1011 adjusts transmission power of the uplink signal. More specifically, the power adjustment unit 1011 adjusts transmission power of a signal or a channel having a low power allocation priority on the basis of Table 2. And the power adjustment unit 1011 controls the transmission unit 1020 so that the uplink signal can be transmitted based on the adjusted transmission power.

Similarly, the power adjustment unit 1011 selects either of the uplink signal and the PRACH based on a power allocation priority and allocates transmission power to the selected one according to the original schedule but does not allocate transmission power to the other. In other words, the power adjustment unit 1011 drops transmission of the other one. To this end, the power adjustment unit 1011 controls the transmission unit 1020 so that only the selected one can be transmitted.

The transmission unit 1020 transmits the uplink signal and the PRACH based on the transmission power adjusted respectively according to the control of the power adjustment unit 1011, where the uplink signal is transmitted to the first serving cell of the first subframe and the PRACH is transmitted to the second serving cell of the first subframe. Similarly, the transmission unit 1020 transmits either of the uplink signal and the PRACH selected according to the control of the power adjustment unit 1011. For example, in case the uplink signal is selected, the transmission unit 1020 transmits the uplink signal to the first serving cell of the first subframe. On the other hand, in case the PRACH is selected, the transmission unit 1020 transmits the PRACH to the second serving cell of the first subframe.

If the E-PH is larger than or equal to threshold power, the power adjustment unit 1011 allocates and distributes the transmission power scheduled originally in the first subframe for transmission of the uplink signal and the PRACH; and the transmission unit 1020 transmits the uplink signal and the PRACH generated by the signal generation unit 1012 to the BS 1050.

The BS 1050 comprises a transmission unit 1055, a reception unit 1060, and a BS processor 1070. The BS processor 1070 again comprises a DCI generation unit 1071 and a scheduling unit 1072.

The transmission unit 1055 transmits random access initiate information to the UE 1000.

The reception unit 1060 receives at least one of the uplink signal and the PRACH from the UE 1000. At this time, the reception unit 1060 receives the uplink signal from the first serving cell and receives the PRACH from the second serving cell. Sometimes the reception unit 1060 can operate in a Discontinuous RX (DRX) mode at which signal discontinuity of the UE is determined.

The DCI generation unit 1071 generates random access initiate information and transmits the generated information to the transmission unit 1055.

The scheduling unit 1072 schedules transmission of the uplink signal of the UE 1000.

The descriptions above are only illustration of the technical principles of the present invention, and it should be noted by those skilled in the art to which the present invention belongs that various modifications and changes are possible without departing from the inherent characteristics of the present invention. Therefore, the embodiments disclosed in this document are not intended to limit the technical principles of the present invention but are intended for description thereof; and the technical scope of the present invention is not limited by the embodiments. The technical scope of the present invention should be interpreted by the appended claims, and it should be understood that all of the technical principles falling within the range equivalent thereto are included in the technical scope of the present invention defined by the appended claims.

What is claimed is:

1. A method for controlling uplink power by a user equipment, comprising:
    generating at least one uplink channel to be transmitted on a first cell and a physical random access channel (PRACH) to be transmitted on a second cell;
    estimating uplink power left based on both a first uplink power for transmitting the at least one uplink channel and a second uplink power for transmitting a physical random access channel (PRACH) to which a random access preamble is mapped;
    adjusting the first uplink power for transmitting the at least one uplink channel based on the uplink power left; and
    transmitting, to the base station, the at least one of the uplink channel and the PRACH based on the adjusted first uplink power,
    wherein the adjusted first power is determined by comparing the uplink power left comprising a summation of the first uplink power and the second uplink power with a threshold value, and
    wherein the adjusting of the first uplink power comprises reducing the first transmission power when the PRACH has a higher priority than the at least one uplink channel.

2. The method of claim 1, wherein the adjusted uplink power left is not lower than the threshold by reducing the first uplink power.

3. The method of claim 1, wherein the uplink channel is a Sounding Reference Signal (SRS).

4. The method of claim 1, wherein the uplink channel comprises at least one of an ACK/NACK signal, Channel Quality Information (CQI), and a rank indicator.

5. The method of claim 1, wherein the uplink channel is a Physical Uplink Shared Channel (PUSCH).

6. The method of claim 1, wherein the uplink channel is a Physical Uplink Control Channel (PUCCH).

7. The method of claim 1, wherein the threshold is 0 dB.

8. A user equipment for controlling uplink power, comprising:
    a memory; and
    a processor operably coupled to the memory,
    wherein the processor, when executing program instructions stored in the memory, is configured to: cause to generate at least one of uplink channel to be transmitted on a first cell and a physical random access channel (PRACH) to be transmitted on a second cell;

estimate uplink power left based on both a first uplink power for transmitting the at least one uplink channel and a second uplink power for transmitting a physical random access channel (PRACH) to which a random access preamble is mapped;

adjusting the first uplink power for transmitting the at least one uplink channel based on the uplink power left; and cause the UE to transmit, to the base station, the at least one uplink channel and the PRACH based on the adjusted first uplink power, wherein the adjusted first power is determined by comparing the uplink power left comprising a summation of the first uplink power and the second uplink power with a threshold value, and wherein the processor reduces the first uplink power in case the PRACH has a higher priority than the at least one uplink channel.

9. The user equipment of claim 8, wherein the adjusted uplink power left is not lower than the threshold by reducing the first uplink power.

10. The user equipment of claim 8, wherein a signal generation unit generates a Physical Uplink Shared Channel (PUSCH) as the uplink channel.

11. The user equipment of claim 8, wherein the processor generates a Physical Uplink Control Channel (PUCCH) as the uplink channel.

12. The user equipment of claim 8, wherein the uplink channel is a Sounding Reference Signal (SRS).

13. The user equipment of claim 8, wherein the uplink channel comprises at least one of an ACK/NACK signal, Channel Quality Information (CQI), and a rank indicator.

14. The user equipment of claim 8, wherein the processor sets the threshold to 0 dB.

* * * * *